(12) United States Patent
Berning et al.

(10) Patent No.: US 11,015,306 B2
(45) Date of Patent: *May 25, 2021

(54) AUTOMOTIVE MILLING MACHINE, AS WELL AS METHOD FOR DISCHARGING MILLED MATERIAL

(71) Applicant: Wirtgen GmbH, Windhagen (DE)

(72) Inventors: Christian Berning, Zuelpich (DE); Sebastian Winkels, Windeck (DE); Harald Kroell, Unkel (DE); Tobias Krista, Bonn (DE)

(73) Assignee: Wirtgen GmbH

( * ) Notice: Subject to any disclaimer, the term of this patent is extended or adjusted under 35 U.S.C. 154(b) by 0 days.

This patent is subject to a terminal disclaimer.

(21) Appl. No.: 16/809,846

(22) Filed: Mar. 5, 2020

(65) Prior Publication Data

US 2020/0263367 A1    Aug. 20, 2020

Related U.S. Application Data

(63) Continuation of application No. 16/246,777, filed on Jan. 14, 2019, now Pat. No. 10,590,613, which is a
(Continued)

(30) Foreign Application Priority Data

Aug. 22, 2014  (DE) .................. 102014216713.2

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *B65G 41/002* (2013.01); *B65G 67/24* (2013.01); *E01C 23/01* (2013.01)

(58) Field of Classification Search
CPC ...... E01C 23/127; E01C 23/088; E01C 23/01; B65G 41/002; B65G 67/24
(Continued)

(56) References Cited

U.S. PATENT DOCUMENTS 3,608,968 A   9/1971   Burnett
4,376,609 A   3/1983   Bohman et al.
(Continued)

FOREIGN PATENT DOCUMENTS

AU   2015215954 A1   3/2016
CN      103397884 A   11/2013
(Continued)

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in the Coal Industry",1986, pp. 43-55.
(Continued)

*Primary Examiner* — Janine M Kreck
*Assistant Examiner* — Michael A Goodwin
(74) *Attorney, Agent, or Firm* — Lucian Wayne Beavers; Gary L. Montle; Patterson Intellectual Property Law, PC

(57) ABSTRACT

In an automotive milling machine, comprising a machine frame, comprising a controller for the travelling and milling operation, comprising a working drum, comprising a transport conveyor, where the transport conveyor is slewable, relative to the machine frame, about a first axis extending essentially horizontally under an elevation angle, and sideways about a second axis extending orthogonally to the first axis under a slewing angle, where the transport conveyor discharges the milled material onto a loading surface of a transport vehicle at a specified conveying speed, and where
(Continued)

the controller continuously controls positioning of the milled material automatically via, as a minimum, the slewing angle of the transport conveyor, it is provided for the following features to be achieved: the controller specifies and monitors limit values for a maximum permissible slewing angle range for slewing the transport conveyor variable in accordance with the current operating situation.

20 Claims, 3 Drawing Sheets

Related U.S. Application Data continuation of application No. 15/795,751, filed on Oct. 27, 2017, now Pat. No. 10,196,784, which is a continuation of application No. 14/827,573, filed on Aug. 17, 2015, now Pat. No. 9,809,937.

(51) Int. Cl.
 *B65G 41/00* (2006.01)
 *B65G 67/24* (2006.01)
 *E01C 23/01* (2006.01)

(58) Field of Classification Search
 USPC ....... 299/1.5, 1.9, 39.2, 39.4, 18; 404/84.05; 460/114, 115
 See application file for complete search history.

(56) References Cited

U.S. PATENT DOCUMENTS

| | | | |
|---|---|---|---|
| 4,834,463 A * | 5/1989 | Nye | E01C 23/088 299/39.2 |
| 4,863,009 A | 9/1989 | Winkel et al. | |
| 5,178,253 A | 1/1993 | Fix | |
| 5,575,316 A | 11/1996 | Pollklas | |
| 5,857,274 A | 1/1999 | Rudiger et al. | |
| 6,247,510 B1 | 6/2001 | Diekhans et al. | |
| 6,366,684 B1 | 4/2002 | Gerard et al. | |
| 6,682,416 B2 | 1/2004 | Behnke et al. | |
| 6,718,746 B2 | 4/2004 | Hettiger et al. | |
| 6,943,824 B2 | 9/2005 | Alexia et al. | |
| 7,831,345 B2 | 11/2010 | Heino et al. | |
| 8,348,044 B2 | 7/2013 | Tebbe et al. | |
| 8,499,537 B2 | 8/2013 | Correns et al. | |
| 8,528,988 B2 | 9/2013 | Von Schoenebeck et al. | |
| 8,590,983 B2 | 11/2013 | Berning et al. | |
| 8,690,474 B2 | 4/2014 | Jurasz et al. | |
| 8,770,386 B2 | 7/2014 | Berning et al. | |
| 8,979,424 B2 | 3/2015 | Berning et al. | |
| 9,126,776 B2 | 9/2015 | von Schoenebeck et al. | |
| 9,809,937 B2 | 11/2017 | Berning et al. | |
| 9,873,993 B2 | 1/2018 | Berning et al. | |
| 2005/0179309 A1 | 8/2005 | Berning et al. | |
| 2005/0207841 A1 | 9/2005 | Holl et al. | |
| 2006/0045621 A1 | 3/2006 | Potts et al. | |
| 2006/0094487 A1 | 5/2006 | Huster et al. | |
| 2007/0122236 A1 | 5/2007 | Gaertner et al. | |
| 2008/0258535 A1 * | 10/2008 | Berning | E01C 23/127 299/39.4 |
| 2009/0044505 A1 * | 2/2009 | Huster | A01D 43/087 56/10.2 R |
| 2009/0229233 A1 | 9/2009 | Pollklas et al. | |
| 2009/0267402 A1 | 10/2009 | Berning et al. | |
| 2010/0014917 A1 | 1/2010 | Willis et al. | |
| 2010/0296867 A1 | 11/2010 | Buschmann et al. | |
| 2011/0061762 A1 | 3/2011 | Madsen et al. | |
| 2011/0080034 A1 | 4/2011 | Schoenebeck et al. | |
| 2011/0123268 A1 | 5/2011 | Berning et al. | |
| 2013/0076101 A1 | 3/2013 | Simon | |
| 2013/0080000 A1 | 3/2013 | Von der Lippe et al. | |
| 2014/0054949 A1 | 2/2014 | Berning et al. | |
| 2014/0084665 A1 | 3/2014 | Motz et al. | |
| 2015/0218762 A1 | 8/2015 | Berning et al. | |
| 2016/0208447 A1 | 7/2016 | Berning et al. | |

FOREIGN PATENT DOCUMENTS

| | | |
|---|---|---|
| CN | 103628397 A | 3/2014 |
| CN | 103628398 A | 3/2014 |
| CN | 203654144 U | 6/2014 |
| CN | 203700926 U | 7/2014 |
| CN | 105386395 A | 3/2016 |
| DE | 155157 A1 | 5/1982 |
| DE | 19628420 A1 | 1/1998 |
| DE | 102005035480 A1 | 2/2007 |
| DE | 202007005756 U1 | 10/2008 |
| DE | 102009041842 A1 | 9/2011 |
| DE | 102012215013 A1 | 2/2014 |
| DE | 102013009361 A1 | 12/2014 |
| DE | 102014216713 A1 | 2/2016 |
| EA | 22806 B1 | 3/2016 |
| EP | 666018 A1 | 8/1995 |
| EP | 1344445 A1 | 9/2003 |
| EP | 1574122 A1 | 9/2005 |
| EP | 2100495 A1 | 9/2009 |
| EP | 2301318 A1 | 3/2011 |
| EP | 2452551 A2 | 5/2012 |
| EP | 2573266 A2 | 3/2013 |
| EP | 2573267 A1 | 3/2013 |
| EP | 2700748 A1 | 2/2014 |
| EP | 2987911 A1 | 2/2016 |
| RU | 2394122 C1 | 7/2010 |
| RU | 2611802 C2 | 3/2017 |
| WO | 2009098294 A2 | 8/2009 |
| WO | 2014029824 A1 | 2/2014 |

OTHER PUBLICATIONS

Database Compendex XP-002538699, Engineering Information, Inc., Gove et al. "Optimizing Truck-Loader Matching", Mining Engineering, Oct. 1994, pp. 1179-1185, Soc. for Mining, Metallurgy & Exploration, Inc.

EPO Search Report in corresponding EP 15180916 dated Dec. 10, 2015, 3 pp. (not prior art).

Office action dated May 3, 2019 in corresponding India Application No. 4303/CHE/2015 (not prior art).

* cited by examiner

AUTOMOTIVE MILLING MACHINE, AS WELL AS METHOD FOR DISCHARGING MILLED MATERIAL

BACKGROUND OF THE INVENTION

1. Field of the Invention

The invention relates to an automotive milling machine, a method for discharging milled material, as well as a road or ground working unit.

2. Description of the Prior Art

With an automotive milling machine, it is known to discharge the milled material onto no less than one transport vehicle comprising a loading surface.

The milling machine comprises a controller for the travelling and milling operation, as well as a working drum for the milling of, for example, a road pavement. A transport conveyor device, for example, a transport conveyor device comprising no less than one transport conveyor, is present in front of or behind the working drum as seen in the direction of travel. The transport conveyor device comprises a discharge end at which the milled material is discharged onto the loading surface of the no less than one transport vehicle via a flight path in the form of a parabolic trajectory attributable to the conveying speed. The last or single transport conveyor of the transport conveyor device as seen in the direction of transport may be slewed sideways, relative to the longitudinal axis of the milling machine, under a specifiable slewing angle to the left or right and may be adjustable in height via a specifiable elevation angle. The conveying speed of the transport conveyor may also be adjustable.

In practical operation, problems arise in coordinating the milling machine with the transport vehicle.

With a forward-loading milling machine, for example, the milled material is discharged towards the front onto the transport vehicle driving ahead. The operator of the milling machine needs to signal to the vehicle driver of the transport vehicle as to when the transport vehicle is to continue moving forward and when it is to stop. This leads to problems because the operator basically needs to concentrate on the milling process and at the same time needs to avoid a collision with the transport vehicle driving ahead.

An additional problem lies in the fact that the operator of the milling machine also needs to deal with optimal loading of the loading surface by adjusting the slewing angle, elevation angle and conveying speed of the last or single transport conveyor of the transport conveyor device as seen in the direction of transport and is thus distracted from his actual task of carrying out the milling operation. A correction of the slewing angle may be required, for example, when altering the steering direction of the milling machine or for uniform loading of the loading surface.

In case of a rearward-loading milling machine, problems also arise in coordinating the milling machine with the transport vehicle especially as the transport vehicle needs to drive behind the milling machine in reverse travel. An even higher level of stress results for the operator of the milling machine as he needs to control the milling process in forward travel on the one hand, and needs to monitor loading of the transport vehicle behind the milling machine as seen in the direction of travel, needs to control the slewing angle, elevation angle and/or conveying speed of the transport conveyor device, and needs to communicate the necessary information for the stop-and-go operation to the vehicle driver on the other.

For reasons of design, the slewing angle range is limited mechanically to approx. ±30° with small milling machines and to approx. ±60° with large milling machines.

From DE 10 2012 215 013 A (US 2015/0218762), it is known to automate the discharging procedure where in particular also the slewing angle of the last or single transport conveyor of the transport conveyor device of the automotive milling machine as seen in the direction of transport is controllable automatically.

When controlling the slewing angle, the problem arises that, due to the many influencing factors such as, for example, cornering, different transport vehicles, distance to the transport vehicle, intermittent operation of the transport vehicle, the operator of the milling machine is quickly overwhelmed so that, in unfavourable circumstances, the milled material can also come down next to the loading surface of the transport vehicle. This is accompanied not only by the loss of the milled material but possibly also by extensive reworking in the event that the lost milled material comes to lie on a traffic lane extending next to the milled track from which it needs to be removed again.

Unintentional controlling errors may occur also in case of an automatic discharging procedure.

SUMMARY OF THE INVENTION

It is therefore the object of the invention to specify an automotive milling machine as well as a method for discharging milled material of a milling machine which, with regard to the control of the transport conveyor, avoids controlling errors and milled material losses.

The invention advantageously specifies for the controller to specify and monitor limit values for a maximum permissible slewing angle range for slewing the transport conveyor.

It is ensured in this way that, in no operating situation, the automatic slewing angle control can slew the transport conveyor into a position in which the transport conveyor slews too far to the side so that the point of impingement of the milled material misses the loading surface. It is understood that the specified maximum permissible slewing angle range limits the design-dependent maximum slewing range.

The controller may preferably specify the limit values for the permissible slewing angle range relative to the machine frame and/or relative to the transport conveyor. The limit values for the permissible slewing angle range relative to the transport conveyor may be specified as a function of time or distance.

Especially when cornering, there is the possibility to specify the limit values dynamically in accordance with the current bend radius. This means that the extent of the slewing angle range may remain unaltered but the alignment of the same relative to the machine frame and/or relative to the transport conveyor is adjustable in accordance with the current bend radius. It is understood that the extent of the slewing angle range may be different in straight-ahead travel or in cornering so that the extent of the slewing range is also alterable dynamically.

In particular, the limit values are varied in accordance with the current operating situation.

It is preferably specified for the machine frame and the transport conveyor to comprise one each longitudinal centre line, where the permissible slewing angle range is limitable unsymmetrically in relation to the longitudinal centre line of the machine frame. The unsymmetrical limitation offers the possibility of considering whether, for example, a traffic lane is present on one of the sides of the loading surface which must not be contaminated while, for example, a shoulder is present on the other side where contamination is irrelevant. The slewing angle range may be determined in absolute terms with regard to the machine frame.

The permissible slewing angle range in relation to the current longitudinal centre line of the transport conveyor may be limitable, symmetrically or unsymmetrically, to a narrower angle range in comparison with the maximum permissible angle range. In addition, the limit values of the slewing angle range may be limitable as a function of time or distance.

Hence, there exists a maximum slewing range relative to the machine frame and, within said maximum permissible slewing angle range, a permissible slewing angle range about the longitudinal centre line of the transport conveyor.

In this design, it may be specified for the controller to comprise a detection and control unit which controls positioning of the milled material on the loading surface automatically, as a minimum, via the slewing angle and/or via the elevation angle and/or the conveying speed of the transport conveyor.

The detection and control unit determines limit values for the current permissible slewing angle range preferably automatically in accordance with the relative position of the longitudinal centre lines to one another and/or the elevation angle adjusted and/or the conveying speed and/or a current steering angle of the milling machine and/or the distance between the milling machine and the transport vehicle.

The controller may receive an information signal about the working space next to the transport vehicle and may reduce or completely lock the maximum permissible slewing angle range in the direction of at least one side of the transport vehicle if, for example, a traffic lane adjoins said at least one side which must not be contaminated. Said information signal is preferably entered into the controller or into the detection and control unit manually by the vehicle driver.

In a preferred embodiment, it is specified for the permissible slewing angle range to be exceedable at a manual control command. It is understood that the manual control command is resettable and/or the permitted exceedance is limitable as a function of time or distance.

Accordingly, it may be specified for the control command to be executable repeatedly, preferably after a predetermined lapse of time or after a minimum distance traveled.

For example, the additionally permitted slewing angle may be related to the current position of the longitudinal centre line of the transport conveyor, and only one fixed angular amount each may be additionally permitted in relation to the current initial position.

In particular, following an alteration of the position of the longitudinal centre line of the transport conveyor, said position may also be accepted as the new initial position for limiting the slewing angle range.

It may additionally be specified for the permissible exceedance at a manual control command to be limited in terms of its amount. For example, the exceedance may be limited to a small angular amount or to a lower slewing speed.

The controller or the detection and control unit, respectively, may detect the alterable position of the loading surface of the transport vehicle relative to the machine frame or the alterable position of the loading surface of the transport vehicle relative to the transport conveyor and automatically determine limit values for the current maximum slewing angle range in accordance with the position of the detected loading surface and/or the elevation angle adjusted and/or the conveying speed and/or a current steering angle of the milling machine and/or the distance between the milling machine and the transport vehicle.

The controller or the detection and control unit may vary the maximum permissible slewing angle range also in accordance with the intermittent operation of the transport vehicle and/or the distance between the milling machine and transport vehicle.

In particular, it may be specified for a first slewing angle range to be specifiable during stoppage of the transport vehicle, and a second slewing angle range to be specifiable during movement of the transport vehicle.

The detection and control unit may alternatively also detect the loading surface and determine the maximum permissible slewing angle range in accordance with a predetermined zone on the loading surface and/or detect the loading condition on the loading surface and vary the maximum permissible slewing angle range in accordance with the loading condition detected.

Such control enables the vehicle driver of the milling machine to concentrate on the milling operation and on travelling along a predetermined milling track. An automatic discharging procedure can thus be realized which ensures automatic coordination of the discharging procedure with the movement of the milling machine and the transport vehicle also when cornering without the maximum permissible slewing ranges of the transport conveyor being exceeded.

In accordance with the loading surfaces of different transport vehicles and/or in accordance with different loading conditions of the loading surface for different positions and/or points of impingement within the position of a loading surface detected by the detection and control unit, control data for the slewing angle range, the elevation angle and/or the conveying speed may be stored in a map which is available to the detection and control unit.

In accordance with the method according to the invention, it is specified for the maximum permissible slewing angle range for slewing the transport conveyor to be limited.

The permissible slewing range is preferably specified relative to the machine frame and/or relative to the current position of the transport conveyor. The slewing angle range may also be varied dynamically in accordance with the current operating situation.

It may be specified to this end that, when cornering, the relative position of the slewing angle range to the machine frame and/or the transport conveyor to be adjusted dynamically in accordance with the current bend radius.

The invention also relates to a road or ground working unit comprising an automotive milling machine and no less than one transport vehicle movable independently of the milling machine and positionable relative to the milling machine in such a fashion that the milled material worked off by the milling machine is discharged onto the transport vehicle.

Hereinafter, embodiments of the invention are illustrated in more detail with reference to the drawings.

BRIEF DESCRIPTION OF THE DRAWINGS

The following is shown.

DETAILED DESCRIPTION

Figure 1:
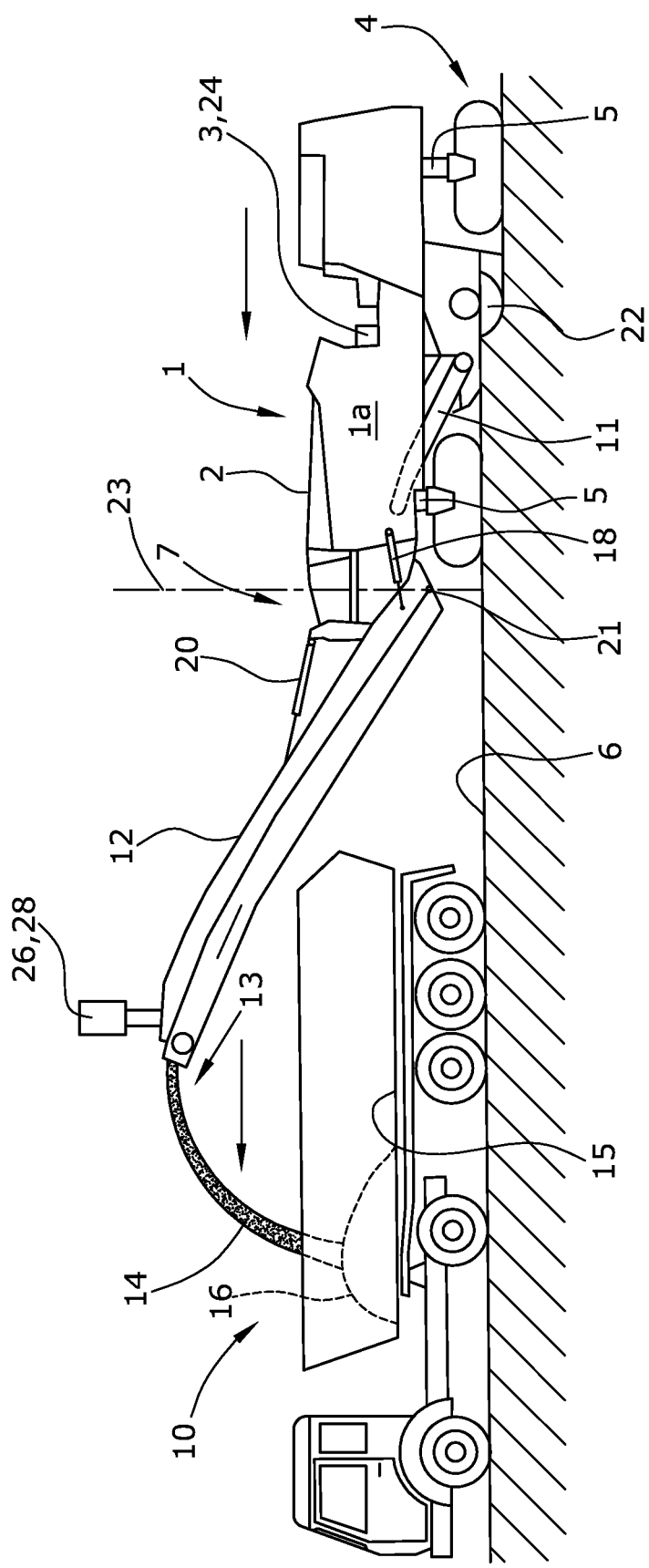
FIG. 1 a forward-loading road milling machine,
FIG. 2 a rearward-loading road milling machine, and
FIG. 3 a top view of a milling machine according to FIG. 1.

FIG. 1 shows a milling machine 1 using as an example a forward-loading road milling machine 1a. Said milling machine 1 comprises a machine frame 2 which is supported by a chassis 4 comprised of, for example, tracked ground-engaging units or wheels, said chassis 4 being connected to the machine frame 2 via no less than three height adjustment devices in the design of lifting columns 5. As can be inferred from FIG. 2, the embodiment specifies four lifting columns 5 which can be used to bring the machine frame 2 into a specifiable plane extending preferably parallel to the road surface 6 which supports the tracked ground-engaging units or wheels of the chassis 4.

The road milling machine shown in FIG. 1 comprises, in longitudinal direction of the milling machine 1a, a working drum 22 between the tracked ground-engaging units of the chassis 4.

The milling machines 1a, 1b may comprise tracked ground-engaging units and/or wheels. The working drum may be adjustable in height via the lifting columns 5 supporting the machine frame 2 or relative to the machine frame 2.

Other designs of a milling machine 1b may also exhibit the working drum 22, for example, at the height of the rear tracked ground-engaging units or wheels of the chassis 4.

The transport conveyor device with no less than one transport conveyor 11, 12 for transporting away the milled-off milled material may also be arranged at the front end 7 or rear end 8 of the milling machine 1a, 1b.

Figure 2:
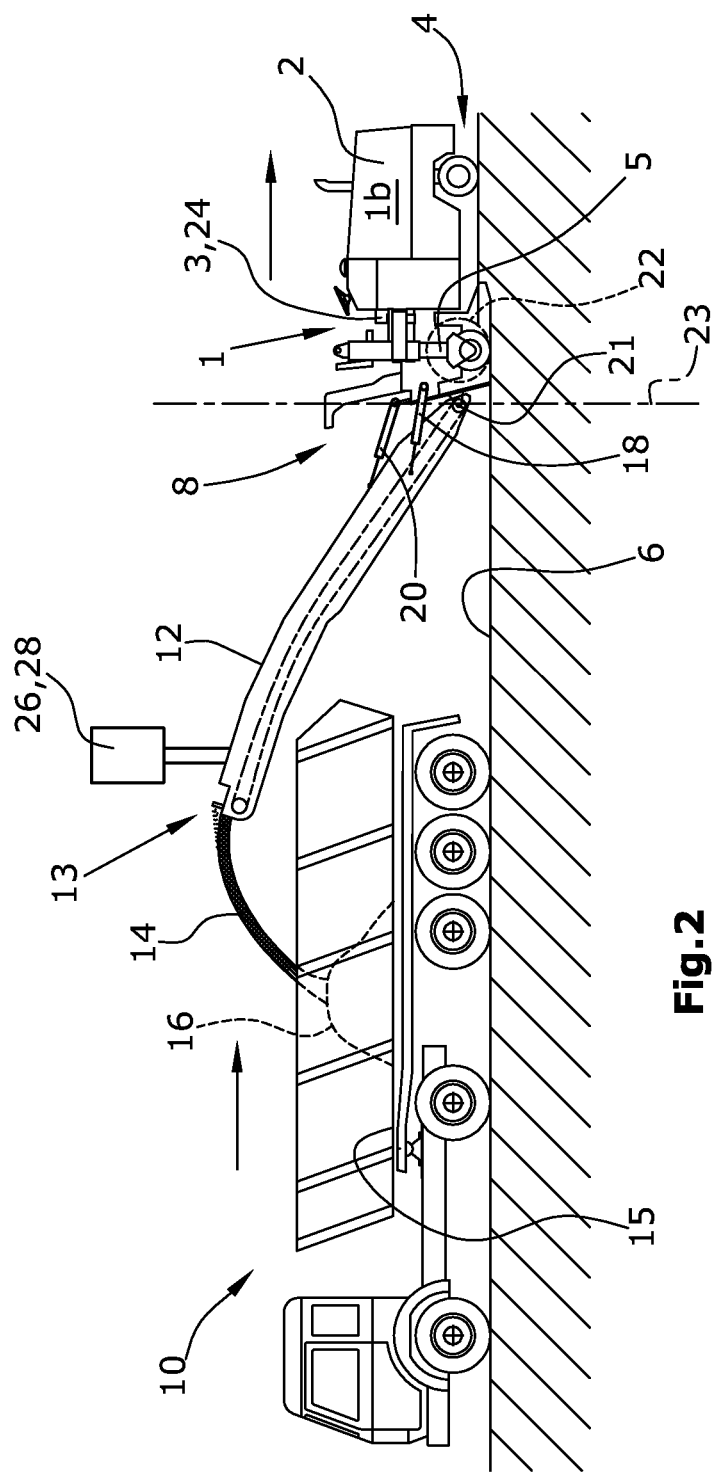

FIG. 2 depicts a rearward-loading milling machine 1b as an example in which the transport vehicle 10 drives behind the milling machine in reverse travel.

Provided that sufficient space is available on the side next to the milling machine 1a, 1b, the transport vehicle 10 may also be moved next to the milling machine 1 in forward travel.

Figure 3:
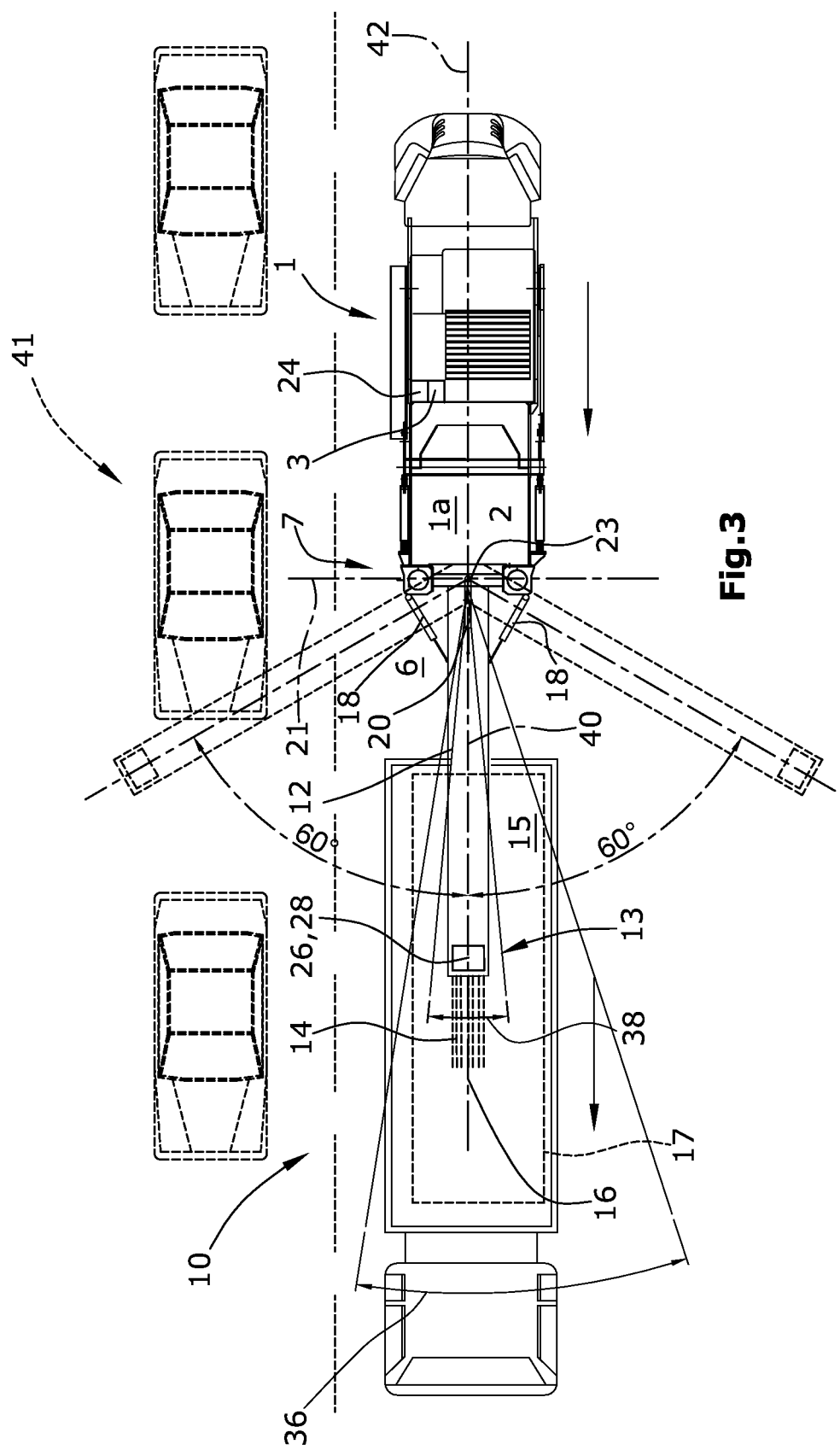

The directions of travel of the respective vehicles in FIGS. 1 to 3 are indicated by arrows.

In the embodiment shown in FIG. 1, the milled material milled off by the working drum 22 is discharged onto the loading surface 15 of the transport vehicle 10 via a first permanently installed transport conveyor 11 of the transport conveyor device which transfers the milled material 14 onto a second slewable transport conveyor 12. As a result of the speed of the transport conveyor 12, the milled material 14 is not discharged immediately at the end of the transport conveyor 12, but the milled material follows a parabolic trajectory so that the point of impingement 16 on the loading surface 15 is present at a distance from the free end 13 of the transport conveyor 12. The transport conveyor 12 may be slewed from a neutral position to the left or to the right via piston-cylinder units 18 in order to be able to discharge the milled material 14 onto the loading surface 15 even when cornering or in the event of the transport vehicle 10 driving in an offset track. In addition, the vehicle driver of the milling machine 1a, 1b can adjust the elevation angle of the transport conveyor 12 by means of a piston-cylinder unit 20. The elevation angle has an influence on the parabolic trajectory of the milled material 14 and on the position of the point of impingement 16, as has the conveying speed of the transport conveyor 12.

FIG. 3 shows an embodiment during straight-ahead travel and with flowing traffic 41. The milling machine 1, with its longitudinal centre line 42, loads the loading surface 15 of the transport vehicle 10 approximately centrally, with an unsymmetrical slewing angle range 36 for the transport conveyor 12 being specified by a controller 3 or a detection and control unit 24. As can be inferred from FIG. 3, the slewing angle range 36 is unsymmetrical, in relation to the longitudinal centre line 42 of the milling machine 1 and in relation to the longitudinal centre line 40 of the transport conveyor 12, to a central position of 0° in which the longitudinal centre line 40 of the transport conveyor 12 is in alignment with the longitudinal centre line 42 of the milling machine 1. The maximum permissible angle range in the direction of the traffic lane 41 extending parallel is smaller than on the side of the loading surface 15 facing away from the parallel traffic lane 41. Said slewing angle range 36 can be varied dynamically by the controller 3 or the detection and control unit 24, respectively, in accordance with the operating situation, namely, in accordance with, for example, one or multiple of the following parameters:

relative position of the longitudinal centre lines 40, 42 to one another, elevation angle adjusted, conveying speed, current steering angle of the milling machine, side of the parallel traffic lane 41, position of the detected loading surface 15, position of a predetermined zone on the loading surface 15, stoppage of the transport vehicle or movement of the transport vehicle 10, loading condition on the loading surface 15, distance of the transport vehicle from the milling machine.

Within the maximum permissible slewing angle range 36, a further slewing angle range 38 may be defined in relation to the longitudinal centre line 40 of the transport conveyor 12 which refers to the current position of the longitudinal centre line 40.

The mechanically feasible maximum slewing range of the transport conveyor 12 amounts to ±60° and is inferable from FIG. 3 by the positions of the transport conveyor illustrated in dashed lines.

Said slewing angle range 38 may also be specified symmetrically or alternatively unsymmetrically to the current position of the longitudinal centre line 40 in particular in conjunction with a time-based and/or distance-dependent switching controller.

The permission of multiple control commands in rapid succession may be limited in such a fashion that each further control command is possible only after the lapse of a predetermined time or distance.

The limit values for the slewing angle ranges 36 and 38 specified by the controller 3 or the detection and control unit 24 can be overcome manually by a corresponding control command to the controller 3 or the detection and control unit 24, respectively, in which arrangement it may alternatively also be specified that the limit values of the maximum permissible slewing angle range 36 must not be exceeded even manually.

In case of emergency, however, the automatic slewing angle control can be deactivated enabling the vehicle driver to autonomously control the slewing movement of the transport conveyor.

With respect to the slewing angle range 38 relating to the longitudinal centre line 40, it may also be specified that, in case of an alteration of the current position of the longitudinal centre line 40 relative to the longitudinal centre line 42, the new position is specified as the initial position for the slewing angle range 38. This may be the case, for example, after the lapse of a predetermined period of time or distance traveled, or may be effected at a corresponding control command by the vehicle driver.

In case of the slewing angle range 36 or 38 having been exceeded, a reset signal can be used to return to the originally adjusted slewing angle ranges 36 or 38, respectively.

In case of an approved exceedance, the angular amount can be limited, namely, for example, to an amount of 1° to 3°.

It may also be specified for the manual control command to be enterable repeatedly and, in case of repetition, to be repeatable only after the lapse of a predetermined period of time or after a predetermined minimum distance traveled.

A further alternative specifies that, in case of exceedance of the predetermined slewing angle range 38, a lower slewing speed is specified for the transport conveyor 12.

The currently adjusted elevation angle about a horizontal first axis 21 or slewing angle about a vertical second axis 23, respectively, may be reported to a detection and control unit 24 which may additionally comprise no less than one detector 26 that continuously detects the position of the loading surface 15 and/or of the last or single transport conveyor 12 as seen in the direction of transport. Said detector 26 may be arranged either at the milling machine 1a, 1b, at the end facing the transport conveyor device, or at the free end 13 of the transport conveyor 12.

The detection and control unit 24 may be integrated into the controller 3 for the travelling and milling operation or may, as a minimum, be connected to the same in order to, should the need arise, also obtain machine data such as, for example, on the travel speed and/or a detected steering angle of the milling machine 1a, 1b and the conveying speed of the transport conveyor 12.

In a specific embodiment, the controller 3 or the detection and control unit 24, respectively, may detect the alterable position of the loading surface 15 of the transport vehicle 10 relative to the machine frame 2 or the alterable position of the loading surface 15 of the transport vehicle 10 relative to the transport conveyor 12 and automatically determine limit values for the current maximum slewing angle range 36, 38 in accordance with the position of the detected loading surface 15 and/or the elevation angle adjusted and/or the conveying speed and/or a current steering angle of the milling machine 1 and/or the distance between the milling machine 1 and the transport vehicle 10.

The detection and control unit 24 may also undertake the task of filling the loading surface 15 in a uniform fashion. A loading program may be specified for this purpose in order to load the loading surface 15 in accordance with a predetermined system. In this arrangement, the filling condition on the loading surface 15 may be detected and analysed by an image-recording system in order to continuously control the conveying speed and/or the position of the discharge end 13 of the transport conveyor 12 relative to the loading surface 15.

Control data for different positions and/or points of impingement 16 may be stored in a map in accordance with the loading surfaces 15 of different transport vehicles 10 and/or in accordance with different loading conditions of the loading surface 15. Such map memory may be integrated in the detection and control unit 24 or in the controller 3. The control data relate to the slewing angle ranges 36, 38, the elevation angle and/or the conveying speed of the transport conveyor 12 for different positions and/or points of impingement 16 within the position of a loading surface 15 detected by the detection and control unit 24.

In the specific embodiment, the detection and control unit 24 may detect the position of the loading surface 15 and/or of the last or single transport conveyor 12 as seen in the direction of transport continuously by means of an image-recording system 28 or a non-optical electronic positioning system which supplies data for determining the position of the loading surface 15 in relation to the machine frame 2 or to the transport conveyor 12. The information provided by the image-recording system 28 may be evaluated by image-analysing methods which are known for themselves.

The controller 3 or the detection and control unit 24, respectively, may compare the data for position determination with predetermined position data in order to, in case of any deviations from the predetermined target position data, perform a continuous positioning control for the position of the discharge end 13 and/or the point of impingement 16 of the milled material 14 and/or a speed control for the conveying speed.

The target position data may be established using a teach-in procedure by means of varying the positions of the vehicles 1a, 1b, 10 in accordance with realistic operating situations and storing the parameters required for each such situation, namely, the maximum permissible slewing angle range 36 and 38, elevation angle and conveying speed of the transport conveyor. In the same way, a loading program may also be created. In doing so, variations in control arising, for example, due to cornering may also be taken into account. In the process, the data read in by means of the reading operation may also differentiate as to whether the transport vehicle 10 is driving on the left or on the right next to the milling track or in the milling track of the milling machine 1a, 1b, and on which side a parallel traffic lane 41 is located.

The invention claimed is:

1. An automotive milling machine for milling off milled material and discharging the milled material onto a loading surface of a transport vehicle, the milling machine comprising:
    a machine frame;
    a working drum supported from the machine frame for milling off the milled material;
    a first transport conveyor arranged to transfer the milled material away from the working drum;
    a second transport conveyor arranged to receive the milled material from the first transport conveyor and to discharge the milled material onto the loading surface of the transport vehicle, wherein the second transport conveyor is slewable relative to a longitudinal center line of the machine frame;
    at least one detector configured to detect a slewing angle of the second transport conveyor relative to the longitudinal center line of the machine frame; and
    a controller connected to the at least one detector and configured to automatically control movement of the second transport conveyor based at least partially on the detected slewing angle.

2. The automotive milling machine of claim 1, wherein the controller is further configured to dynamically specify limit values for a maximum permissible slewing angle range relative to the longitudinal center line of the machine frame.

3. The automotive milling machine of claim 2, wherein the maximum permissible slewing angle range is unsymmetrical relative to the longitudinal center line of the machine frame, and dynamically varied in accordance with a current operating situation of the milling machine.

4. The automotive milling machine of claim 3, wherein the current operating situation of the milling machine comprises a determined one or more sides of the milling machine corresponding to a parallel traffic lane.

5. The automotive milling machine of claim 1, wherein the controller is configured to
dynamically specify a first set of limit values for a maximum permissible slewing angle range relative to the longitudinal center line of the machine frame, and
dynamically specify a second set of limit values for a slewing angle range relative to a longitudinal center line of the second transport conveyor, each of said limit values in the second set of limit values being within the maximum permissible slewing angle range relative to the longitudinal center line of the machine frame.

6. The automotive milling machine of claim 5, wherein the second set of limit values are unsymmetrical relative to the longitudinal center line of the machine frame, and dynamically varied in accordance with a current operating situation of the milling machine.

7. The automotive milling machine of claim 6, wherein the current operating situation of the milling machine comprises a determined one or more sides of the milling machine corresponding to a parallel traffic lane.

8. The automotive milling machine of claim 1, wherein:
the second transport conveyor is controllably slewable relative to the longitudinal center line of the machine frame via a first one or more piston-cylinder units, and
an elevation angle of the second transport conveyor is controllably adjusted via a second one or more piston-cylinder units.

9. The automotive milling machine of claim 1, further comprising at least a second detector configured to detect a position of the loading surface relative to the machine frame or the second transport conveyor as seen in a direction of transport, and
wherein the controller is connected to the at least a second detector and further configured to perform a continuous positioning control for one or more of:
a position of a discharge end of the second transport conveyor;
a point of impingement of the milled material on the loading surface; and
a conveying speed of the second transport conveyor.

10. The automotive milling machine of claim 1, wherein the detector is provided in an image-recording system.

11. The automotive milling machine of claim 1, wherein the detector is provided in a non-optical electronic positioning system.

12. A method of discharging worked-off milled material of an automotive milling machine onto a loading surface of a transport vehicle, the method comprising:
transferring milled material away from a milling drum via a first transport conveyor and to a second transport conveyor;
discharging the milled material via the second transport conveyor onto the loading surface of the transport vehicle in accordance with a slewing angle relative to a longitudinal center line of a machine frame of the milling machine;
detecting the slewing angle of the second transport conveyor relative to the longitudinal center line of the machine frame of the milling machine; and
automatically controlling movement of the second transport conveyor based at least partially on the detected slewing angle.

13. The method of claim 12, further comprising dynamically specifying limit values for a maximum permissible slewing angle range relative to the longitudinal center line of the machine frame.

14. The method of claim 13, wherein the maximum permissible slewing angle range is unsymmetrical relative to the longitudinal center line of the machine frame, and dynamically varied in accordance with a current operating situation of the milling machine.

15. The method of claim 14, wherein the current operating situation of the milling machine comprises a determined one or more sides of the milling machine corresponding to a parallel traffic lane.

16. The method of claim 12, further comprising:
dynamically specifying a first set of limit values for a maximum permissible slewing angle range relative to the longitudinal center line of the machine frame, and
dynamically specifying a second set of limit values for a slewing angle range relative to a longitudinal center line of the second transport conveyor, each of said limit values in the second set of limit values being within the maximum permissible slewing angle range relative to the longitudinal center line of the machine frame.

17. The method of claim 16, wherein the second set of limit values are unsymmetrical relative to the longitudinal center line of the machine frame, and dynamically varied in accordance with a current operating situation of the milling machine.

18. The method of claim 17, wherein the current operating situation of the milling machine comprises a determined one or more sides of the milling machine corresponding to a parallel traffic lane.

19. The method of claim 12, wherein:
the second transport conveyor is controllably slewable relative to the longitudinal center line of the machine frame via a first one or more piston-cylinder units, and
an elevation angle of the second transport conveyor is controllably adjusted via a second one or more piston-cylinder units.

20. The method of claim 12, further comprising:
detecting a position of the loading surface relative to the machine frame or the second transport conveyor as seen in a direction of transport, and
performing a continuous positioning control for one or more of:
a position of a discharge end of the second transport conveyor;
a point of impingement of the milled material on the loading surface; and
a conveying speed of the second transport conveyor.

* * * * *